(12) United States Patent
Kagawa et al.

(10) Patent No.: US 7,612,927 B2
(45) Date of Patent: Nov. 3, 2009

(54) IMAGE PROCESSING DEVICE

(75) Inventors: Shuichi Kagawa, Tokyo (JP); Hiroaki Sugiura, Tokyo (JP); Hideyuki Kaneko, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 953 days.

(21) Appl. No.: 10/438,107

(22) Filed: May 15, 2003

(65) Prior Publication Data
US 2003/0215132 A1    Nov. 20, 2003

(30) Foreign Application Priority Data
May 15, 2002    (JP)    ............... 2002-139682

(51) Int. Cl.
G03F 3/08    (2006.01)
G06F 15/00    (2006.01)
G06K 9/00    (2006.01)

(52) U.S. Cl. .......... 358/523; 358/1.9; 382/162

(58) Field of Classification Search ............. 358/1.9, 358/518, 523, 520, 535, 526, 500, 3.16, 3.19; 382/162, 167, 164; 345/22, 72, 205, 600
See application file for complete search history.

(56) References Cited

U.S. PATENT DOCUMENTS

| | | | |
|---|---|---|---|
| 5,150,109 A | | 9/1992 | Berry |
| 5,357,353 A | | 10/1994 | Hirota |
| 5,491,496 A | | 2/1996 | Tomiyasu et al. |
| 5,588,050 A | | 12/1996 | Kagawa et al. |
| 5,708,515 A | | 1/1998 | Nishiura |
| 5,764,201 A | * | 6/1998 | Ranganathan ............... 345/3.3 |
| 5,825,336 A | * | 10/1998 | Fujita et al. .................. 345/2.3 |
| 5,874,928 A | | 2/1999 | Kou |
| 5,915,098 A | * | 6/1999 | Palmer et al. ............... 709/247 |
| 5,949,556 A | * | 9/1999 | Tamai ......................... 358/518 |
| 6,049,316 A | | 4/2000 | Nolan et al. |
| 6,125,202 A | | 9/2000 | Kagawa et al. |
| 6,434,268 B1 | | 8/2002 | Asamura et al. |
| 6,441,870 B1 | * | 8/2002 | Rapaich ...................... 348/674 |

(Continued)

FOREIGN PATENT DOCUMENTS

CN    2300135 Y    12/1998

(Continued)

*Primary Examiner*—Madeleine A Nguyen
(74) *Attorney, Agent, or Firm*—Birch, Stewart, Kolasch & Birch, LLP

(57) ABSTRACT

An image data generator generates first image data consisting of a plurality of color data and being an image information for each pixel. An image processor including a color converter applies image processing such as color conversion on the first image data. An image display unit displays an image using image data consisting of second color data. An image data output unit outputs the first image data to the outside. The image display unit performs image display using the image data having received image-processing such as color conversion, while the image data output unit and outputs to the outside the image data before receiving the image processing. It is possible to obtain an image processing device capable of realizing an "exact color reproduction" or a "preferred color reproduction" on an image display image display unit, and outputting, to the outside, image data in the form of a standard image data, without reflecting the characteristics of the image display unit.

9 Claims, 15 Drawing Sheets

U.S. PATENT DOCUMENTS

| | | | |
|---|---|---|---|
| 6,542,150 B1 | 4/2003 | Kotha et al. | |
| 6,543,870 B1* | 4/2003 | Kakutani | 347/15 |
| 6,704,123 B1* | 3/2004 | Av-Shalom et al. | 358/2.99 |
| 6,903,733 B1* | 6/2005 | Greenberg et al. | 345/204 |
| 6,914,613 B2* | 7/2005 | Marchand et al. | 345/593 |
| 7,068,857 B1* | 6/2006 | Touchard et al. | 382/299 |
| 7,180,524 B1* | 2/2007 | Axelrod | 345/593 |
| 7,315,386 B1* | 1/2008 | Shiimori et al. | 358/1.15 |
| 2001/0003543 A1* | 6/2001 | Kagawa et al. | 382/162 |
| 2001/0035989 A1* | 11/2001 | Takemoto | 358/518 |
| 2001/0039567 A1* | 11/2001 | Baker et al. | 709/203 |
| 2001/0051007 A1* | 12/2001 | Teshima | 382/305 |
| 2002/0080380 A1* | 6/2002 | Sugiura et al. | 358/1.13 |
| 2002/0097411 A1* | 7/2002 | Roche et al. | 358/1.9 |
| 2002/0163655 A1* | 11/2002 | Zhou | 358/1.4 |
| 2003/0007191 A1* | 1/2003 | Herbert | 358/462 |
| 2003/0021470 A1* | 1/2003 | Kakutani | 382/162 |
| 2003/0117394 A1* | 6/2003 | Muraki et al. | 345/419 |
| 2004/0095432 A1* | 5/2004 | Kakutani | 347/43 |
| 2005/0024364 A1* | 2/2005 | Shouen | 345/501 |
| 2005/0047652 A1* | 3/2005 | Kagawa et al. | 382/162 |

FOREIGN PATENT DOCUMENTS

| | | | |
|---|---|---|---|
| EP | 1 197 917 A2 | | 4/2002 |
| JP | 60-220660 A | | 11/1985 |
| JP | 63-39188 B2 | | 8/1988 |
| JP | 2073257 A | * | 3/1990 |
| JP | 04-304775 A | | 10/1992 |
| JP | 04-335771 A | | 11/1992 |
| JP | 04-369969 A | | 12/1992 |
| JP | 05-115001 A | | 5/1993 |
| JP | 05-244405 A | | 9/1993 |
| JP | 7-95427 A | | 4/1995 |
| JP | 8-170471 A | | 2/1996 |
| JP | 10-91135 A | | 4/1998 |
| JP | 11-175549 A | | 7/1999 |
| JP | 2000-165686 A | | 6/2000 |
| JP | 2002-116750 A | | 4/2002 |
| KR | 2002-0008858 | | 2/2002 |

* cited by examiner

FIG. 6

|  |  | VALUE OF X | |
|---|---|---|---|
|  |  | EVEN NUMBER | ODD NUMBER |
| VALUE OF Y | EVEN NUMBER | 0 | 3 |
|  | ODD NUMBER | 2 | 1 |

FIG. 7A

| 64 | 64 | 65 | 65 | 66 | 66 | 67 | 67 | 68 | 68 |
|---|---|---|---|---|---|---|---|---|---|
| 64 | 64 | 65 | 65 | 66 | 66 | 67 | 67 | 68 | 68 |

PIXEL

FIG. 7B

| 16 | 16 | 16 | 16 | 16 | 16 | 16 | 16 | 17 | 17 |
|---|---|---|---|---|---|---|---|---|---|
| 16 | 16 | 16 | 16 | 16 | 16 | 16 | 16 | 17 | 17 |

FIG. 8A

| 64 | 64 | 65 | 65 | 66 | 66 | 67 | 67 | 68 | 68 |
|----|----|----|----|----|----|----|----|----|----|
| 64 | 64 | 65 | 65 | 66 | 66 | 67 | 67 | 68 | 68 |

PIXEL

FIG. 8B

| 0 | 3 | 0 | 3 | 0 | 3 | 0 | 3 | 0 | 3 |
|---|---|---|---|---|---|---|---|---|---|
| 2 | 1 | 2 | 1 | 2 | 1 | 2 | 1 | 2 | 1 |

FIG. 8C

| 64 | 67 | 65 | 68 | 66 | 69 | 67 | 70 | 68 | 71 |
|----|----|----|----|----|----|----|----|----|----|
| 66 | 65 | 67 | 66 | 68 | 67 | 69 | 68 | 70 | 69 |

FIG. 8D

| 16 | 16 | 16 | 17 | 16 | 17 | 16 | 17 | 17 | 17 |
|----|----|----|----|----|----|----|----|----|----|
| 16 | 16 | 16 | 16 | 17 | 16 | 17 | 17 | 17 | 17 |

AVERAGE:16  AVERAGE:16.25  AVERAGE:16.5  AVERAGE:16.75  AVERAGE:17

| IDENTIFICATION CODE S1 | MAXIMUM VALUE $\beta$ | MINIMUM VALUE $\alpha$ | HUE DATA THAT ARE ZERO* |
|---|---|---|---|
| 0 | R1 | G1 | g, c |
| 1 | R1 | B1 | b, c |
| 2 | G1 | R1 | r, m |
| 3 | G1 | B1 | b, m |
| 4 | B1 | R1 | r, y |
| 5 | B1 | G1 | g, y |

*FROM $r=R1-\alpha$, $g=G1-\alpha$, $b=B1-\alpha$, $y=\beta-B1$, $m=\beta-G1$, $c=\beta-R1$

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

FIG. 18A

| HUE | EFFECTIVE FIRST ARITHMETIC TERM |
|---|---|
| RED | h1r |
| GREEN | h1g |
| BLUE | h1b |
| CYAN | h1c |
| MAGENTA | h1m |
| YELLOW | h1y |

FIG. 18B

| INTER-HUE AREA | EFFECTIVE SECOND ARITHMETIC TERM |
|---|---|
| RED-YELLOW | h2ry |
| YELLOW-GREEN | h2gy |
| GREEN-CYAN | h2gc |
| CYAN-BLUE | h2bc |
| BLUE-MAGENTA | h2bm |
| MAGENTA-RED | h2rm |

IMAGE DATA GENERATOR

IMAGE PROCESSING DEVICE

BACKGROUND OF THE INVENTION

1. Field of the Invention

The present invention relates to an image processing device having an image data generator generating image data which consists of a plurality of color data and is an image information for each pixel, an image data output unit outputting the image data to the outside of the device, and an image display unit displaying an image using the image data consisting of a plurality of color data, and in particular to an image processing device performing image processing on the image data, in accordance with the color reproduction characteristics of the image display unit provided in a notebook-type personal computer or the like.

2. Conventional Art

FIG. 19 is a block diagram showing an example of configuration of a conventional image processing device. In the drawing, reference numeral 1 denotes an image data generator, 2 denotes an image display unit, and 3 denotes an image data output unit. The image data generator 1 generates and outputs first color data R1, G1, B1 constituting first image data. R1, G1, B1 respectively denote color data representing red, green and blue, respectively. The first color data R1, G1, B1 are input to the image display unit 2 and the image data output unit 3. The image display unit 2 is formed for example of a liquid crystal panel, and generates an image which can be visually perceived by a human being based on the first color data R1, G1, B1, and displays the generated image. The image data output unit 3 outputs the first color data R1, G1, B1 to the outside. For instance, a notebook-type personal computer has a configuration as shown in FIG. 19.

FIG. 20 is a block diagram showing an example of the image data generator 1. As illustrated, it comprises an image data 4, an image data reader 5, and a frame buffer 6. The image data storage 4 stores a plurality of image data in advance. The image data reader 5 reads out appropriate image data R10, G10, B10 from among a plurality of image data stored in the image data storage 4, and writes the image data in the frame buffer 6, at a writing rate. The image data is read out of the frame buffer 6 at a reading rate in conformity with the image display rate, and output as the first image data.

Each image display unit 2 has a unique color reproduction characteristics. FIG. 21 is an xy chromaticity diagram illustrating the color reproduction characteristics of liquid crystal panels used in notebook-type personal computers. Each of the three triangles depicted by the solid line represents the color gamut of each of three types of liquid crystal panels. The vertexes of each triangle represents the color reproduction (or rendition) of red, green and blue. The triangle depicted by the broken lines represents the color gamut of the standard color space sRGB stipulated by IEC61966-2-1. The difference in the color gamut leads to difference in the color reproduction characteristics if no image processing such as color conversion is applied.

It is observed from FIG. 21 that the color reproduction characteristics of each liquid crystal panel is different from the color reproduction characteristics according to the sRGB which is a standard color space. Moreover, different types of liquid crystal panels have different color reproduction characteristics. Display units other than liquid crystal panels have yet different color reproduction characteristics. Accordingly, the color reproduction of the image displayed on the image display unit 2 in the conventional image processing device differs substantially depending on the color reproduction characteristics of the image display unit, and it was not possible to realize an "exact color reproduction" which is a color reproduction as intended by the image creator. Moreover, it was not possible to realize a "preferred color reproduction" which is a color reproduction as preferred by the user.

It can be conceived to solve this problem by reflecting the color reproduction characteristics of the image display unit 2, when generating the first color data at the image data generator 1. FIG. 22 shows another example of configuration of the image data generator 1. Members 4, 5 and 6 are identical to those in FIG. 20. The image data generator 1 of the illustrated example further includes a color converter 7, which converts the image data R10, G10, B10, into the first color data R1, G1, B1 constituting the first image data. The conversion from the image data R10, G10, B10 to the first color data R1, G1, B1 can be achieved by the following equation (1).

$$\begin{bmatrix} R1 \\ G1 \\ B1 \end{bmatrix} = (Aij) \begin{bmatrix} R10 \\ G10 \\ B10 \end{bmatrix} \qquad (1)$$

In the equation (1), i=1 to 3, j=1 to 3.

The matrix coefficients Aij in the equation (1) are determined based on the color reproduction characteristics of the image display unit 2. For instance, the coefficients are so determined that the relationship between the image data R10, G10, B10 and the chromaticity of the colors displayed on the image display unit 2 is closest to the relationship stipulated by the standard color space sRGB.

When this condition is met, the first color data R1, G1, B1 are data reflecting the color reproduction characteristics of the image display unit 2. The first color data R1, G1, B1 are also output via the image data output unit 3 to the outside. The image data output to the outside may be supplied to various image processing devices, or image display devices, so that it is preferred that they do not reflect the characteristics of a specific device, but have a standard characteristics. For instance, if the color reproduction characteristics of the image display unit 2 is such that red is displayed as magentish red (red tinged with magenta), the color converter 7 shown in FIG. 22 performs such processing that red is converted to and hence displayed as yellowish red, for the correction of the magentish red, in producing the first color data. The first color data is output through the image data output unit 3 to the outside. If the first color data is supplied to an image display device having such a characteristics that red is displayed as yellowish red, the yellowishness is emphasized.

Also, it is becoming a standard practice in color management to exchange, between devices, data according the standard color space such as sRGB, and the correction of the color reproduction characteristics of individual devices is effected in respective devices. This is another reason why the image data output to the outside should not reflect the color reproduction characteristics of the image display unit.

As has been described, in a conventional image processing device, the color reproduction of the image displayed by the image display unit differs very much depending on the color reproduction characteristics of the particular image display unit, and it is often impossible to achieve an "exact color reproduction." Moreover, it is often impossible to achieve a "preferred color reproduction" which is a color reproduction preferred by the user. Moreover, if the image data is generated to be suitable for the color reproduction characteristics of the image display unit, the image data output to the outside becomes one which reflects the color reproduction characteristics of the image data display unit, and, in the image processing device or an image display device that is externally connected to receive the output image data, it is not possible to realize an "exact color reproduction," or "preferred color reproduction." In a worst combination of the characteristics of the image processing device and the characteristics of the externally connected image display device, the image displayed by the image display device connected outside may collapse.

SUMMARY OF THE INVENTION

The present invention has been made to solve the above problems, and its object is to provide an image processing device realizing an "exact color reproduction" or a "preferred color reproduction" by an image display unit in an image processing device, and capable of outputting a standard image data, without reflecting the characteristics of the image display unit, on the image data output to the outside.

An image processing device according to the present invention comprises an image data generator generating a first image data which consists of a plurality of color data and is an image information for each pixel, an image processor including a color converter, and calculating a second image data consisting of a plurality of color data by performing image processing including color conversion on the first image data, an image display unit displaying an image using the second image data, and an image data output unit outputting the first image data to the outside.

With such an arrangement, the image data generator generates the first image data R1, G1, B1 as data according to the standard color space such as sRGB, and the image data output unit outputs the first image data R1, G1, B1 to the outside of the device, while the image display unit is supplied with the second image data having been color-converted at the color converter in the image processor, with the result that an "exact color reproduction" or a "preferred color reproduction" is realized for the image displayed on the image display unit, while the image data output to the outside of the device is image data according to the standard color space, without reflecting the characteristics of the image display unit. As a result, externally connected image processing device or image display device need only to be able to handle or process the image data according to the standard color space, so that color management is easy. Moreover, with a conventional image processing device, if color conversion is performed placing a priority on the color reproduction of the image displayed on the image display device within the image processing device, there is a possibility that, depending on the combination of the characteristics of the image display device in the image processing device, and the characteristics of the externally connected image display device, the image displayed on the externally connected image display device collapses. In contrast, according to the image processing device according to the invention, it is possible to avoid the collapse of the image displayed on the externally connected image display device.

The image data generator may be adapted to generate the first image data as a digital data, and the image data output unit may be adapted to output the first image data after conversion into an analog data.

With such an arrangement, it is possible to connect an image processing device or image display device having an analog image data input.

The image processor in the image processing device according to the present invention may further include a tone converter converting the tone of the image data having been color-converted by the color converter.

With such an arrangement, it is possible to achieve image display with a desired tone characteristics at the image display unit. For instance, when an "exact color reproduction" is intended, a tone stipulated by a standard color space such as sRGB is realized, while when a "preferred color reproduction" is intended, a tone characteristics that is preferred may be realized.

The image processor may further include a dither processor performing dither processing on the image data having been color-converted by the color converter.

With such an arrangement, it is possible to simulate the display information of a greater number of bits than the number of bits of the data that can be input to the image display unit, i.e., the number of bits that can be displayed. When the number of bits of data that can be displayed on the image display device is limited, it may not be possible to express slight differences in color, or discontinuities may occur in the change of data. These problems can be avoided by the provision of the dither processor.

The color converter may include a coefficient generator generating predetermined matrix coefficients, an arithmetic term calculator calculating a plurality of arithmetic terms each of which is effective for only a specific hue among a plurality of hues, and a matrix calculator performing matrix calculation using the matrix coefficients and the arithmetic terms each of which is effective for only the specific hue.

With such an arrangement, it is possible to adjust only the specific hue to have the preferred color reproduction, without affecting other hues. Moreover, with the conventional image processing device, when the color reproduction of only the specific hue is adjusted, placing a priority on the color reproduction of the image displayed on the image display device provided in the image processing device, there is a possibility that, depending on the combination of the characteristics of the image display device in the image processing device, and the characteristics of the externally connected image display device, only the color reproduction of the specific hue collapses, in the image displayed on the externally connected image display device, and only the collapse in the color reproduction of the hue is very conspicuous. These problems can be avoided by the image processing device of the invention.

The color converter may comprise a coefficient generator generating predetermined matrix coefficients, an arithmetic term calculator calculating a plurality of arithmetic terms each of which is effective for only a region (inter-hue region) between specific hues among a plurality of hues, and a matrix calculator performing matrix calculation on the matrix coefficients and the arithmetic terms which is effective for only the inter-hue region.

With such an arrangement, it is possible to adjust only the specific inter-hue region to have a preferred color reproduction, without affecting other inter-hue regions. Moreover, with the conventional image processing device, when the color reproduction of only the specific inter-hue region is adjusted, placing a priority on the color reproduction of the image displayed on the image display device provided in the image processing device, there is a possibility that, depending on the combination of the characteristics of the image display device in the image processing device, and the characteristics of the externally connected image display device, only the color reproduction of the specific inter-hue region collapses, in the image displayed on the externally connected image display device, and only the collapse in the color reproduction of the inter-hue region is very conspicuous. These problems can be avoided by the image processing device of the invention.

The plurality of hues may include six hues of red, green, blue, cyan, magenta and yellow.

With such an arrangement, it is possible to prevent collapse in the color reproduction in the specific hue or inter-hue region in the image displayed on the externally connected image display device.

BRIEF DESCRIPTION OF THE DRAWINGS

In the attached drawings:—

FIG. 6 shows an example of dither coefficients used in the image processing device according to Embodiment 3 of the invention;

FIG. 7A and FIG. 7B show an example of conversion into color data of six bits from color data of eight bits in a case where dither processing is not effected;

FIG. 8A to FIG. 8D show an example of conversion into color data of six bits from color data of eight bits in a case where dither processing is effected;

FIG. 18A and FIG. 18B show the arithmetic terms which relate to and are effective for each hue and inter-hue region, in the image processing device according to Embodiment 4 of the invention;

DETAILED DESCRIPTION OF THE PREFERRED EMBODIMENTS

The invention will now be described with particular reference to the accompanying drawings illustrating embodiments of the invention.

Embodiment 1.

Figure 1:
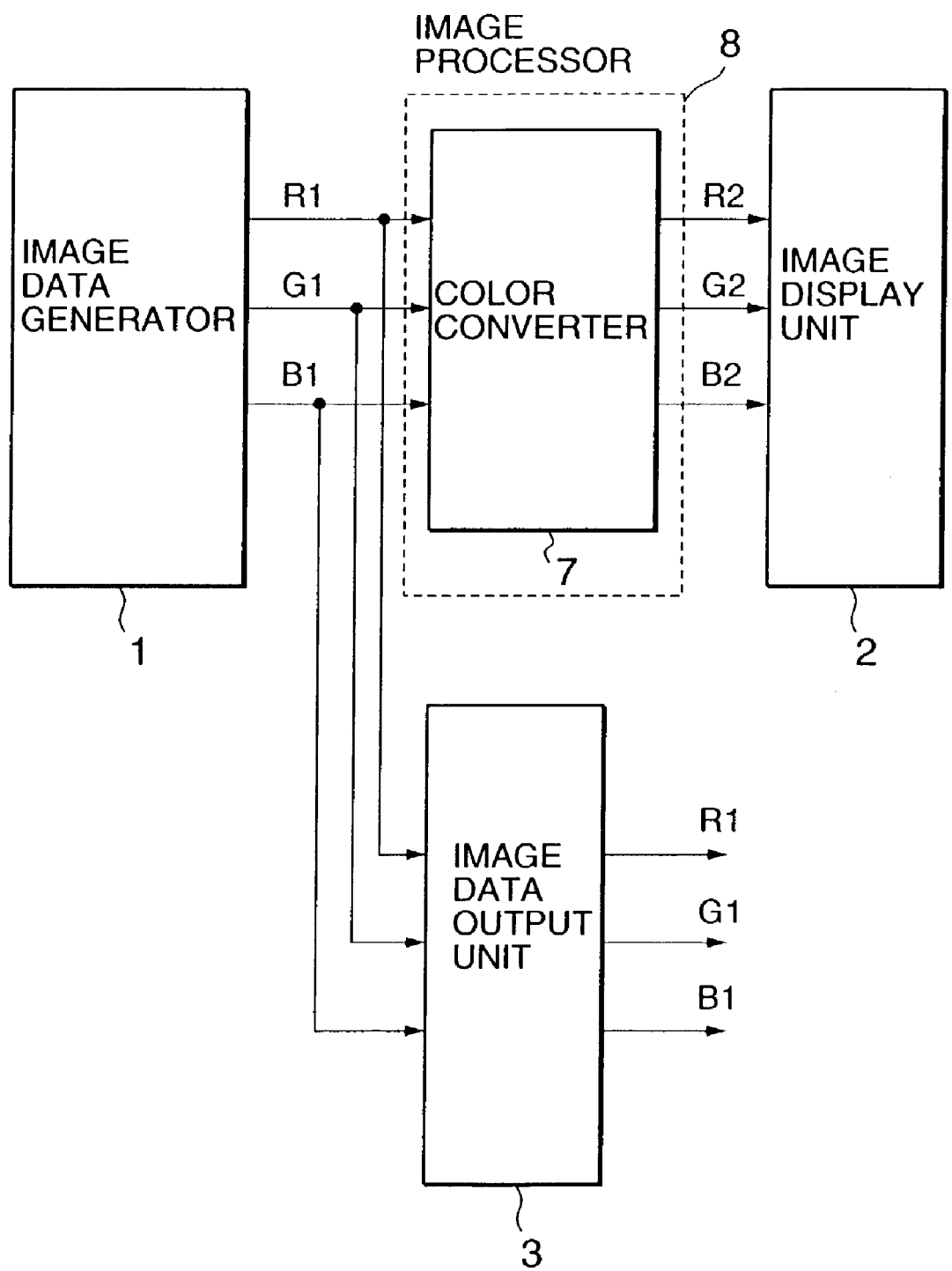
FIG. 1 is a block diagram showing an example of configuration of an image processing device according to Embodiment 1 of the invention.

FIG. 1 is a block diagram showing an example of configuration of an image processing device according to an embodiment of the invention. In FIG. 1, reference numeral 1 denotes an image data generator, 2 denotes an image display unit, 3 denotes an image data output unit, 7 denotes a color converter, and 8 denotes an image processor. The image data generator 1 generates and outputs first color data R1, G1, B1 constituting first image data. R1, G1, B1 are color data respectively representing red, green, blue. The first color data R1, G1, B1 are input to the image processor 8 and the image data output unit 3. The image processor 8 includes the color converter 7, and the first color data R1, G1, B1 are input to the color converter 7. The color converter 7 calculates second color data R2, G2, B2 constituting second image data, from the first color data R1, G1, B1, and the second color data R2, G2, B2 are output, as an output of the image processor 8, to the image display unit 2. R2, G2, B2 are also color data representing red, green and blue. The image display unit 2 is formed for example of a liquid crystal panel, and generates, from the second color data R2, G2, B2, an image that can be visually perceived by a human being, and displays the image. The image data output unit 3 outputs to the outside of the device the first color data R1, G1, B1.

It is becoming a standard practice in recent years as a method of color management to exchange image data between devices in the form of data according to a standard color space such as sRGB stipulated by IEC61966-2-1, and to apply correction to the color reproduction characteristics of individual devices within the respective devices. Accordingly, by having the image data generator generate the first image data R1, G1, B1 according to a standard color space, such as sRGB, and by having the first image data R1, G1, B1 output through the image data output unit to the outside of the device, color management in a situation where another device is connected becomes easier.

In the image processing device shown in FIG. 1, the color converter 7 is assumed to perform matrix calculation accord ing the following equation (2) to generates the second color data R2, G2, B2.

$$\begin{bmatrix} R2 \\ G2 \\ B2 \end{bmatrix} = (Aij) \begin{bmatrix} R1 \\ G1 \\ B1 \end{bmatrix} \quad (2)$$

In the equation (2), i=1 to 3, j=1 to 3.

The matrix coefficients Aij in the equation (2) are determined based on the color reproduction characteristics of the image display unit 2. For instance, when an "exact color reproduction" is aimed at, the matrix coefficients may be made to have such values that the relationship between the first image data R1, G1, B1 and the chromaticity of the colors displayed on the image display unit 2 is closest to the relationship as stipulated by the standard color space sRGB. Then, the image data generated according to the standard color space sRGB can be reproduced with a color reproduction close to that intended at the time of creation.

According to IEC61966-2-1 stipulating the standard color space sRGB, the relationship between the image data R, G, B and the tristimulus values X, Y, Z of colors that are rendered responsive to the image data R, G, B is expressed by mathematical formulae. Accordingly, it is possible to determine the tristimulus values X, Y, Z of the colors that should be displayed, responsive to the values of the image data R, G, B. Accordingly, the tristimulus values X, Y, Z of colors that should be displayed responsive to representative combinations of the first image data R1, G1, B1 are calculated, and the values of the matrix coefficients Aij are determined in such a manner as to make the tristimulus values X, Y, Z of colors actually displayed on the image display unit 2 closer to the calculated tristimulus values.

When a "preferred color reproduction" is realized by the image display unit 2, the color reproduction is not necessarily equal to an "exact color reproduction." Generally, with regard to skin color, and blue color of the sky, green color of grasses, there are what are called memory colors, and actual colors are not necessarily preferred. In particular, there is a tendency that brighter colors are preferred for the blue color of sky, and green colors of grass and trees. In such a case, the matrix coefficients Aij are so determined that preferred colors are displayed.

As has been described, according to the image processing device according to the invention, the image data generator generates the first image data R1, G1, B1 as data according to the standard color space such as sRGB, and the image data output unit outputs the first image data R1, G1, B1 to the outside of the device, while the image display unit is supplied with the second image data having been color-converted at the color converter in the image processor, with the result that an "exact color reproduction" or a "preferred color reproduction" is realized for the image displayed on the image display unit, while the image data output to the outside of the device is image data according to the standard color space, without reflecting the characteristics of the image display unit. As a result, externally connected image processing device or image display device need only to be able to handle or process the image data according to the standard color space, so that color management is easy. Moreover, with a conventional image processing device, if color conversion is performed placing a priority on the color reproduction of the image displayed on the image display device within the image processing device, there is a possibility that, depending on the combination of the characteristics of the image display device in the image processing device, and the characteristics of the externally connected image display device, the image displayed on the externally connected image display device collapses. In contrast, according to the image processing device according to the invention, it is possible to avoid the collapse of the image displayed on the externally connected image display device.

Embodiment 2.

Figure 2:
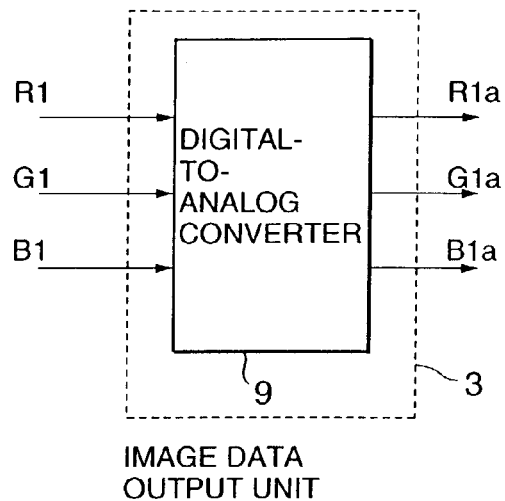
FIG. 2 is a block diagram showing an example of configuration of the image data output unit 3 in the image processing device according to Embodiment 2 of the invention.

FIG. 2 is a block diagram showing an example of configuration of an image data output unit 3 in the image processing device according to Embodiment 2 of the invention. In the drawing, reference numeral 9 denotes a digital-to-analog converter. The configuration of the image processing device according to the present embodiment is identical to that of Embodiment 1, except for the image data output unit 3.

The image data generator 1 generates the first image data R1, G1, B1 as digital data, which are input to the image data output unit 3. The image data output unit 3 is provided with a digital-to-analog converter 9, and the first image data R1, G1, B1 are input to the digital-to-analog converter 9. The digital-to-analog converter 9 converts the first image data R1, G1, B1 in the form of digital data, into another first image data R1a, G1a, B1a in the form of analog data, and outputs the analog data to the outside of the device.

Accordingly, the image data output to the outside of the image processing device according to the present embodiment, are analog image data, so that it is possible to connect an image processing device or image display device having an analog image data input.

Embodiment 3.

Figure 3:
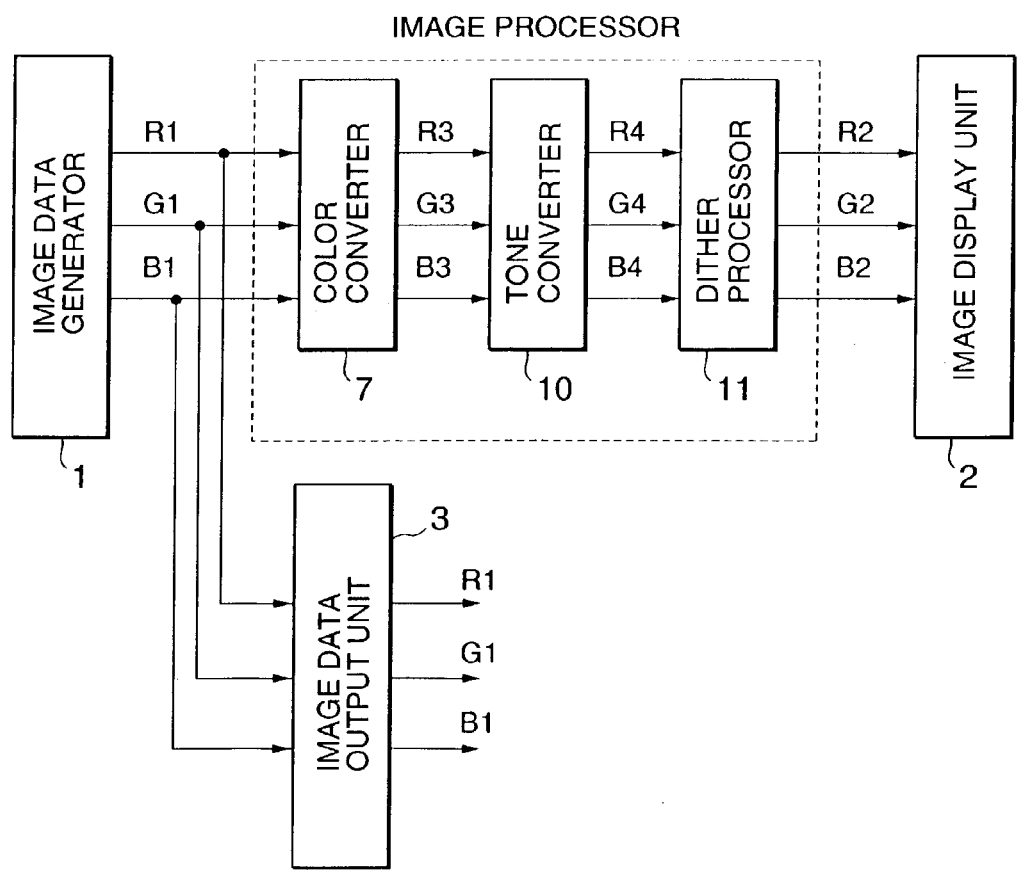
FIG. 3 is a block diagram showing an example of configuration of the image processing device according to Embodiment 3 of the invention.

FIG. 3 is a block diagram showing an example of configuration of an image processing device according to Embodiment 3 of the invention. In the drawing, reference numerals 1, 2, 3, 7 denote members identical to those with the same reference numerals in FIG. 1 relating to Embodiment 1. Reference numeral 8 denotes an image processing device according to the present embodiment, 10 denotes a tone converter, and 11 denotes a dither processor. The image processing device according to the present embodiment differs from that of Embodiment 1 only with regard to the configuration of the image processor 8.

The operation in which the first color data R1, G1, B1 constituting the first image data generated at the image data generator are input to the image processor 8 and the image data output unit 3 is the same as that described in connection with Embodiment 1. The image processor 8 is provided with the color converter 7, the tone processor 10 and the dither processor 11, and the first color data R1, G1, B1 are input to the color converter 7. The color converter 7 calculates, from the first color data R1, G1, B1, third color data R3, G3, B3 constituting a third image data, and outputs the calculated third color data. The third color data R3, G3, B3 are also color data representing red, green, blue, respectively.

As in Embodiment 1, the color converter 7 performs matrix calculation according to the following equation (3), to calculate the third color data R3, G3, B3.

$$\begin{bmatrix} R3 \\ G3 \\ B3 \end{bmatrix} = (Aij) \begin{bmatrix} R1 \\ G1 \\ B1 \end{bmatrix} \quad (3)$$

In the equation (3), i=1 to 3, j=1 to 3.

The third color data R3, G3, B3 output from the color converter 7 are input to the tone converter 10. The tone converter 10 applies tone conversion processing suitable in accordance with the tone characteristics of the image display unit 2, to the third color data R3, G3, B3, to calculate fourth color data constituting fourth image data R4, G4, B4, and outputs the calculated fourth color data. The fourth color data R4, G4, B4 are also color data representing red, green, blue, respectively.

Figure 4:
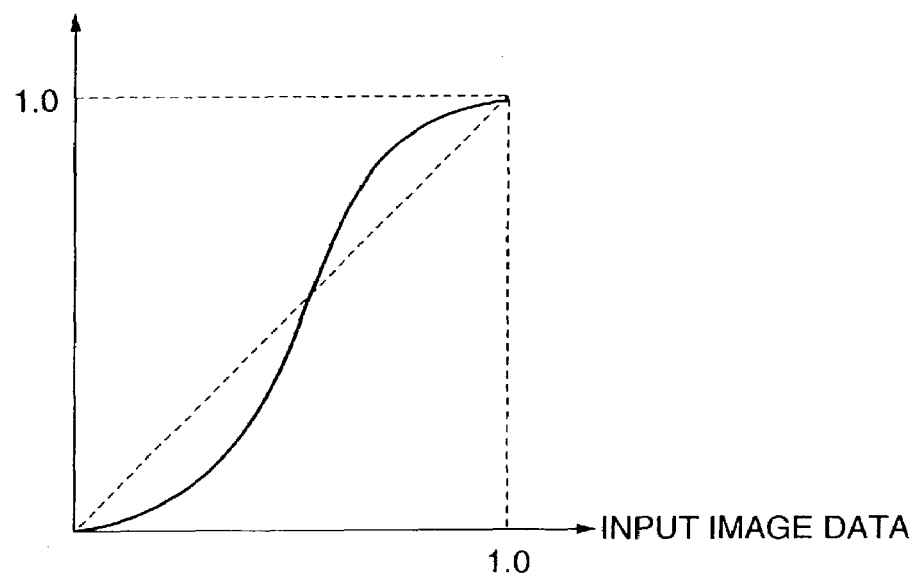
FIG. 4 shows an example of tone characteristics of a liquid crystal panel.

When the image display unit 2 is formed of a liquid crystal panel, the tone characteristics is often of S-shaped. FIG. 4 shows an example of tone characteristics, i.e., the relationship between the value of the input image data and the displayed luminance. In FIG. 4, the values of the image data and the luminance are normalized. On the other hand, the tone characteristics as stipulated by the standard color space, such as sRGB can often be expressed by a power function, i.e., by the following equation (4).

$$Y = a \times x^\gamma \quad (4)$$

In the equation (4), a and γ are constants.

Accordingly, when the image display unit 2 is intended to realize an "exact color reproduction," tone converter 10 is made to produce the fourth color data R4, G4, B4 such that the relationship between the third color data R3, G3, B3 and the luminance displayed on the image display unit 2 is made closer to the relationship represented by the equation (4). Moreover, when it is intended to realize a "preferred color reproduction," the fourth color data R4, G4, B4 are determined so that a desired tone characteristics according to the preference is realized.

The fourth color data R4, G4, B4 output from the tone converter 10 are input to the dither processor 11. The dither processor 11 applies dither processing to the fourth color data R4, G4, B4, to calculate the second color data R2, G2, B2 constituting the second image data, and outputs the calculated second color data. The dither processing performed at the dither processor 11 is used to simulate, by means of data of a limited number of bits, information of a larger number of bits. For instance, if the fourth color data R4, G4, B4 are of 8 bits each, and the input of the image display unit is of only 6 bits for each color, the second color data R2, G2, B2 needs to be of 6 bits each.

Figure 5:
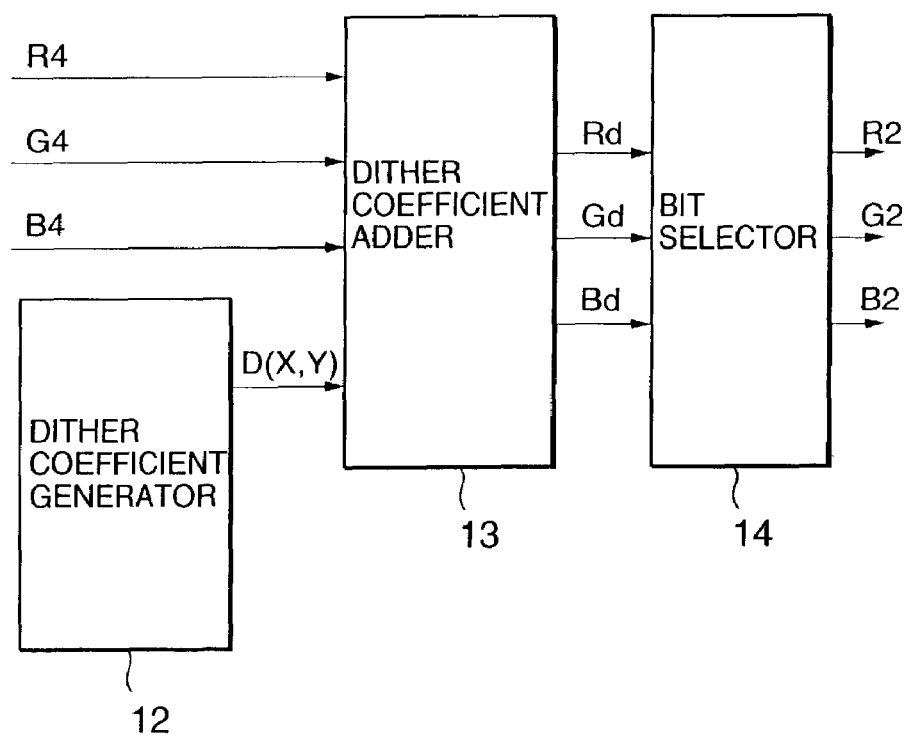
FIG. 5 is a block diagram showing an example of configuration of the dither processor 11 in the image processing device according to Embodiment 3 of the invention.

FIG. 5 is a block diagram showing an example of configuration of the dither processor 11. In the drawing, reference numeral 12 denotes a dither coefficient generator, 13 denotes a dither coefficient adder, and 14 denotes a bit selector. The dither coefficient generator 12 generates dither coefficients D(X, Y) corresponding to the pixel position based on X, Y which is information representing the pixel position. Input to the dither coefficient adder 13 are the fourth color data R4, G4, B4 and the dither coefficients D(X, Y) from the dither coefficient generator 12. The dither coefficient adder 13 performs the addition according to the following equation (5), to calculates the dither coefficient-added color data Rd, Gd, Bd. The dither coefficient-added color data Rd, Gd, Bd are data of 8 bits, and if the result of the addition of the fourth color data and the dither coefficients exceeds "255 (in decimal notation)" the output is made to have a value "255 (in decimal notation)."

$$Rd = R4 + D(X, Y) \quad (5)$$
$$Gd = G4 + D(X, Y)$$
$$Bd = B4 + D(X, Y)$$

The dither coefficient-added color data Rd, Gd, Bd are input to the bit selector 14. The bit selector 14 selects the upper 6 bits of each of the dither coefficient-added color data Rd, Gd, Bd, and outputs the selected bits as the second color data R2, G2, B2 constituting the second image data. Accordingly the second color data R2, G2, B2 are of 6 bits.

Further discussion is made with reference to specific numerical examples. Let us assume a case where the dither coefficients D(X, Y) generated by the dither coefficient generator 12 are of values shown in FIG. 6. If the dither coefficients D(X, Y) generated by the dither coefficient generator 12 have such a relationship as shown in FIG. 6 with respect to the values of data X, Y representing the pixel position, the color data obtained by the bit selection after the addition of dither coefficient (obtained by the dither processing) can simulate information of a number of bits larger by two bits than the actual number of bits. For instance, the 6 bit data obtained by the dither processing can simulate information of 8 bits. The effect of the dither processing is described with reference to FIG. 7A, FIG. 7B and FIG. 8A to FIG. 8D.

FIG. 7A and FIG. 7B show an example of conversion, without dither processing, from a color data of 8 bits to a color data of 6 bits. FIG. 7A shows values, in decimal notation, of color data of 8 bits before the conversion, while FIG. 7B shows values, in decimal notation, of color data of 6 bits after the conversion. The squares depicted by the partitions in FIG. 7A and FIG. 7B represent pixels where the respective color data exist. For simplicity, FIG. 7A and FIG. 7B show one color data for each pixel. In the case shown in FIG. 7A and FIG. 7B, where dither processing is not applied, the lower two bits of the 8 bit color data are omitted for the conversion into color data of 6 bits. As a result, the data corresponding to the lower two bits are completely lost, and four values "64," "65," "66," and "67" of 8 bit data are all converted into the same value "16" of 6 bit color data.

FIG. 8A to FIG. 8D show an example of conversion, with dither processing, from a color data of 8 bits to a color data of 6 bits. FIG. 8A shows values, in decimal notation, of 8 bit color data before the conversion. The squares depicted by the partitions in FIG. 8A to FIG. 8D represent pixels where respective color data exist. For simplicity, FIG. 8A to FIG. 8D show one color data for each pixel. FIG. 8B show dither coefficients added to the color data shown in FIG. 8A. The dither coefficients are generated according to the rule shown in FIG. 6. FIG. 8C shows values, in decimal notation, of 8 bit dither coefficient-added color data, which are obtained by the addition of the 8 bit color data shown in FIG. 8A and the dither coefficients shown in FIG. 8B. FIG. 8D shows values, in decimal notation, of 6 bit color data obtained by omitting the lower two bits of the dither coefficient-added color data shown in FIG. 8C. The 6 bit color data shown in FIG. 8D preserve the information of the lower two bits having been omitted, if they are viewed in units of four pixels, consisting of vertically aligned two bits by horizontally aligned two bits.

Thus, by performing the dither processing using the dither coefficients shown in FIG. 6, as described above, information 2 bit more than the actual number of bits can be represented, when seen in units of four pixels. That is, by performing the dither processing using the dither coefficients shown in FIG. 6, it is possible to simulate information 2 bit more than the actual number of bits. In the present embodiment, the dither coefficients shown in FIG. 6 are used as an example, but the dither processing may be performed using various other dither coefficients, to simulate more information than the actual number of bits.

As has been described, according to the image processing device of the present invention, the tone converter is provided in the image processor, so that an image display can be achieved at the image display unit with a preferred tone characteristics. For instance, when an "exact color reproduction" is intended, a tone stipulated by the standard color space such as sRGB, while when a "preferred color reproduction" is intended, a preferred tone characteristics can be realized. Moreover, according to the image processing device of the present embodiment, the image processor is provided with the dither processor, so that it is possible to simulate information of a greater number of bits than the number of bits which can be input to and displayed by the image display unit. When the number of bits which can be displayed by the image display device is small, it may not be possible to express slight difference between colors, or the variation in the data may become discontinuous. Such problems can be solved by providing the dither processor.

Embodiment 4.

Figure 9:
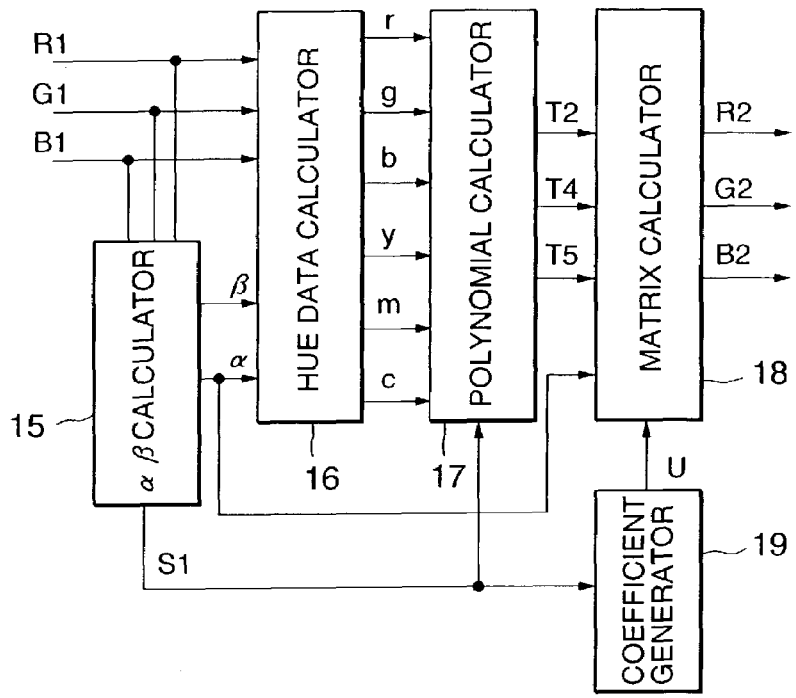
FIG. 9 is a block diagram showing an example of configuration of a color converter 7 in the image processing device according to Embodiment 4 of the invention.

FIG. 9 is a block diagram showing an example of color converter 7 in the image processing device according to Embodiment 4 of the present invention. In the drawing, reference numeral 15 denotes an αβ calculator which calculates and outputs a maximum value β and a minimum value α of the input first color data R1, G1, B1, and also generates and outputs an identification code identifying the combination of which of the first color data R1, G1, B1 is the maximum and which of the first color data is the minimum. Reference numeral 16 denotes a hue data calculator calculating, from the first color data R1, G1, B1 and the outputs of the αβ calculator 15, hue data r, g, b, y, m, c. Reference numeral 17 denotes a polynomial calculator, 18 denotes a matrix calculator, and 19 denotes a coefficient generator. The configuration other than the color converter 7 may be identical to that of Embodiment 1.

Figure 10:
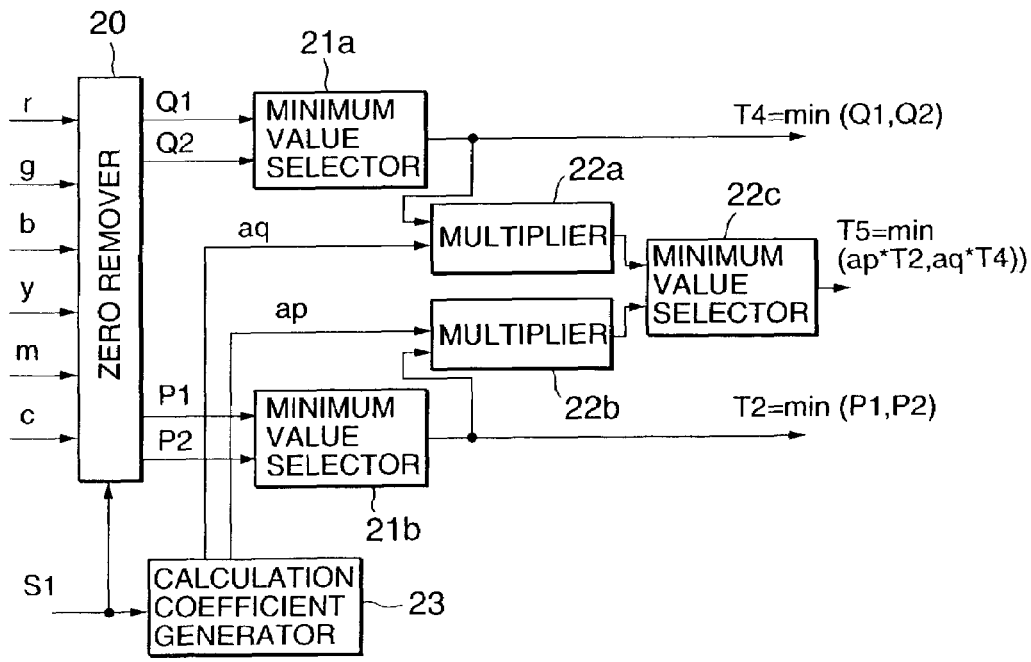
FIG. 10 is a block diagram showing an example of configuration of the polynomial calculator 17 in the color converter in the image processing device according to Embodiment 4 of the invention.

FIG. 10 is a block diagram showing an example of configuration of the polynomial calculator 17. In the drawing, reference numeral 20 denotes a zero remover which removes data having a value zero, among the input hue data. Reference numerals 21a, 21b, 21c denote minimum value selectors for selecting and outputting the minimum value of the input data. Reference numeral 23 denotes a calculation coefficient generator which generates, from the identification code from the αβ calculator 1, calculation coefficients, and outputs the generated coefficients. Reference numerals 22a, 22b denote multipliers multiplying the calculation coefficients represented by the output of the calculation coefficient generator 23, with the outputs of the minimum value selectors 21a and 21b.

The operation will next be described. The input first color data R1, G1, B1 are supplied to the αβ calculator 15 and the hue data calculator 16, and the αβ calculator 15 calculates and outputs the maximum value β and minimum value α of the first color data R1, G1, B1, and generates and outputs the identification code S1 specifying the data which is the maximum of the first color data R1, G1, B1, and the data which is the minimum of the first color data R1, G1, B1.

The hue data calculator 16 receives the first color data R1, G1, B1, and the maximum value β and the minimum value α, which are output from the αβ calculator 15, and performs the subtraction:

r=R1−α,
g=G1−α,
b=B1−α, and
y=β−B1,
m=β−G1,
c=β−R1, and outputs the six hue data r, g, b, y, m, c.

The maximum value β and the minimum value α calculated at the αβ calculator 15 are given by:

β=MAX(R1, G1, B1), and
α=MIN(R1, G1, B1), and the six hue data r, g, b, y, m, c calculated at the hue data calculator 16 are given by the subtraction:

r=R1−α,
g=G1−α,
b=B1−α, and
y=β−B1,
m=β−G1,
c=β−R1, so that the six hue data have such characteristics that two of them are of a value zero. That is, at least one of r, g, b and at least one of y, m, c, in other words, at least two of r, g, b, y, m, c are zero, and which of them are zero depend on the particular combination of the maximum and the minimum of R1, G1, B1. For instance, when R1 is the maximum and G1 is the minimum, (i.e., β=R1, α=G1), the above subtraction will result in:

g=0, and
c=0, and when R1 is the maximum, and B1 is the minimum (i.e., β=R1, α=B1), the above subtraction will result in:

b=0, and
c=0.

Figures 11, 12, 13:
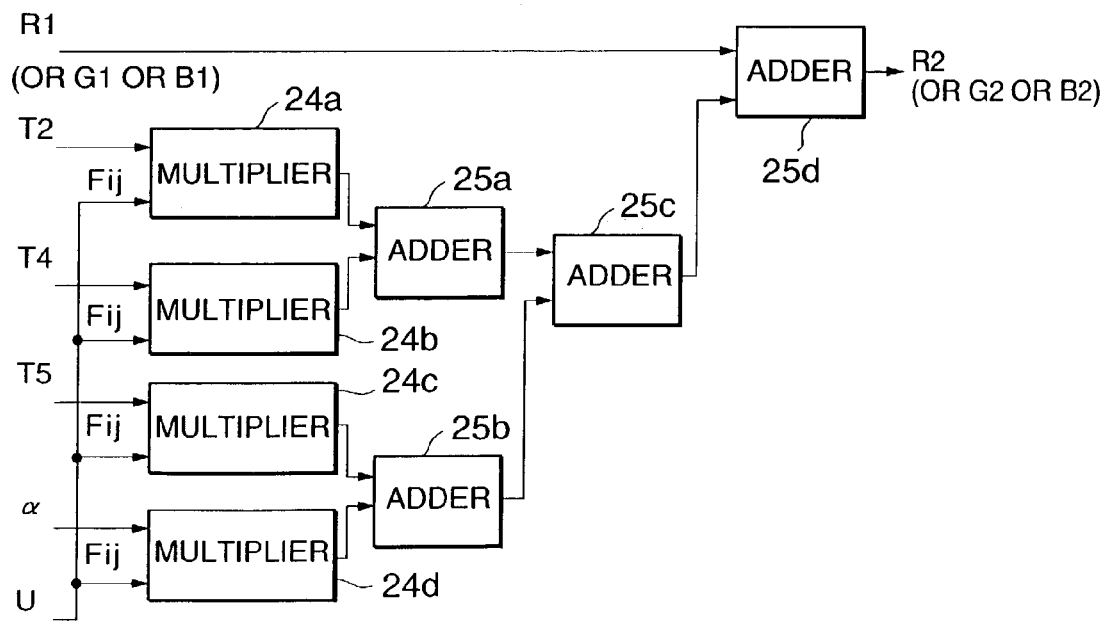
FIG. 11 shows an example of the relationship between the identification code S1 and the maximum value β and minimum value α, and the data that are zero, in the image processing device according to Embodiment 4 of the invention.
FIG. 12 shows the operation of the zero remover 20 in the polynomial calculator 17 in the image processing device according to Embodiment 4 of the invention.
FIG. 13 is a block diagram showing an example of configuration of part of the matrix calculator 18 in the image processing device according to Embodiment 4 of the invention.
Figure 14A:
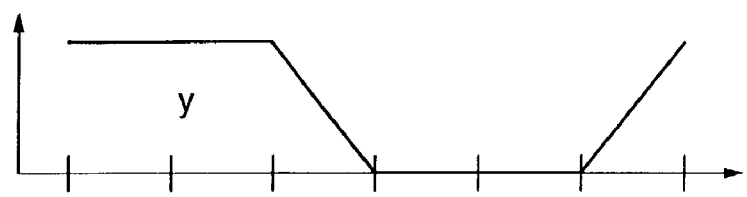
FIG. 14A to FIG. 14F schematically illustrate the relationship between the six hues and the hue data.
Figure 14B:
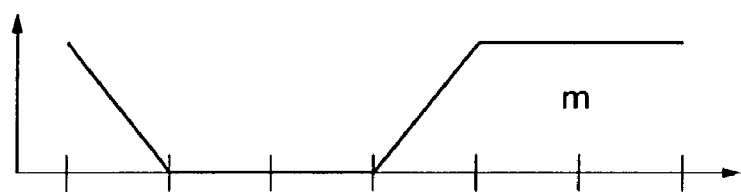
Figure 14C:
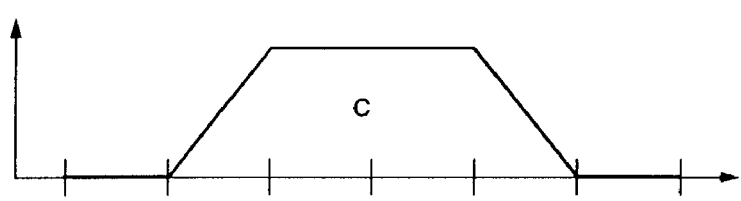
Figure 14D:
Figure 14E:
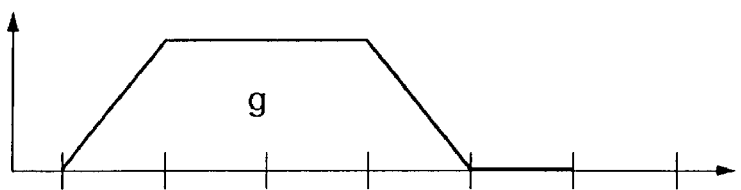
Figure 14F:
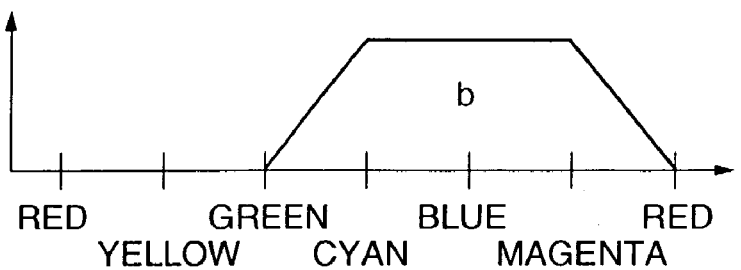
Figure 15A:
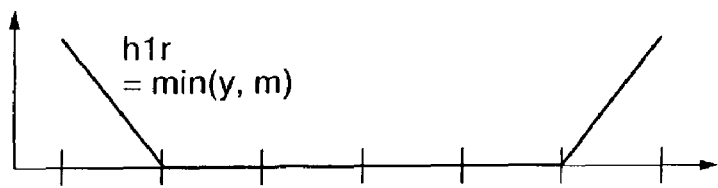
FIG. 15A to FIG. 15F schematically illustrate the relationship between the first arithmetic terms and the hues in the image processing device according to Embodiment 4 of the invention.
Figure 15B:
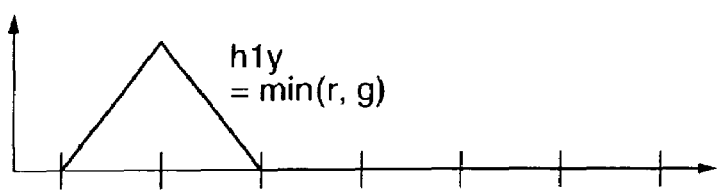
Figure 15C:
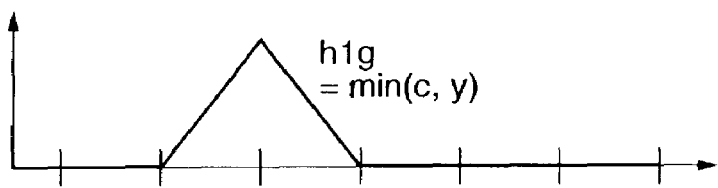
Figure 15D:
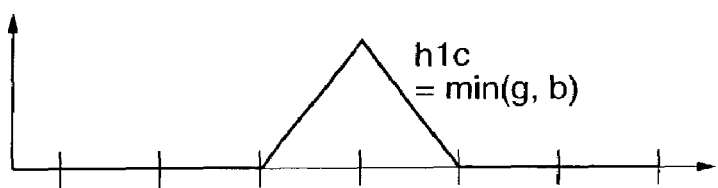
Figure 15E:
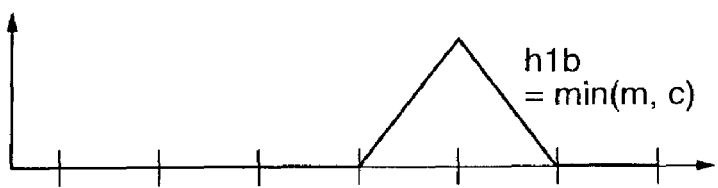
Figure 15F:
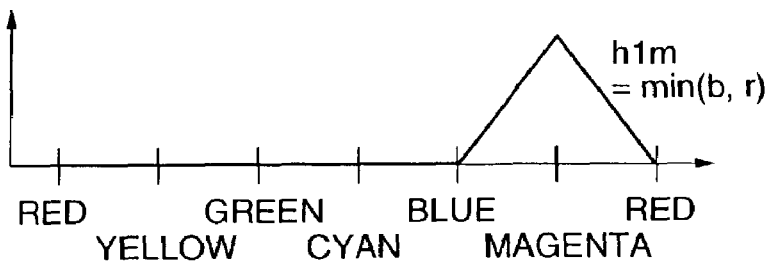
Figure 16A:
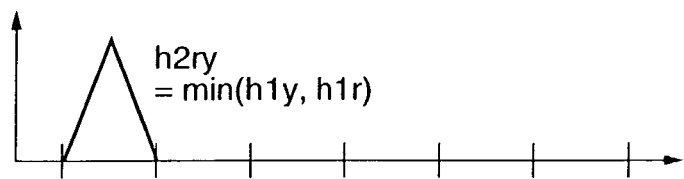
FIG. 16A to FIG. 16F schematically illustrate the relationship between the second arithmetic terms and the hues in the image processing device according to Embodiment 4 of the invention.
Figure 16B:
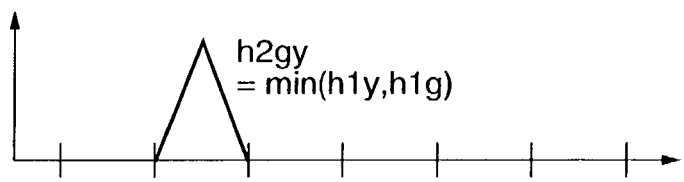
Figure 16C:
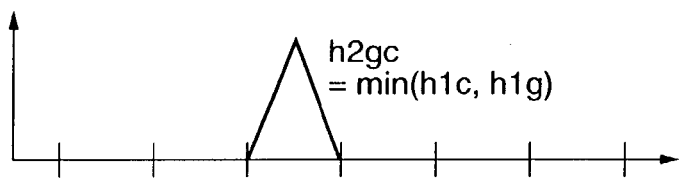
Figure 16D:
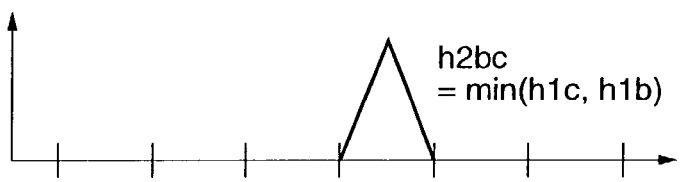
Figure 16E:
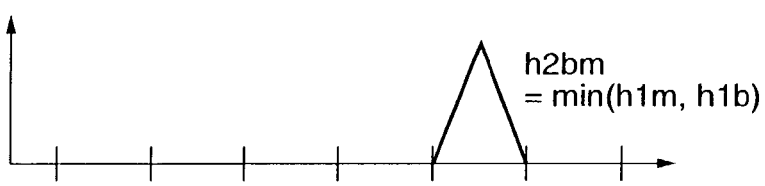
Figure 16F:
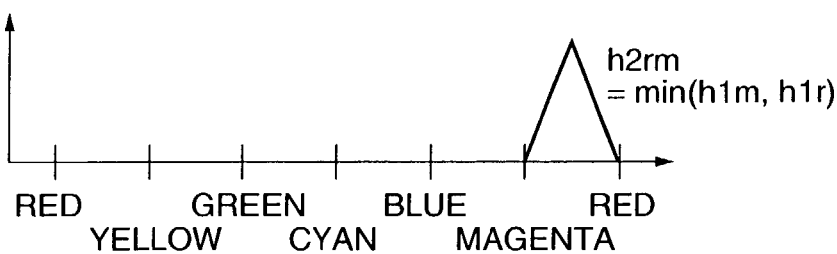
Figure 17A:
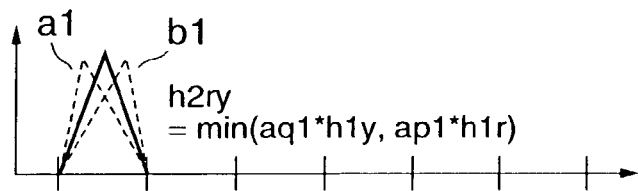
FIG. 17A to FIG. 17F schematically illustrate the relationship between the second arithmetic terms and the hues, with the calculation coefficients from the calculation coefficient generator 23 in the polynomial calculator 17 being varied, in the image processing device according to Embodiment 4 of the invention.
Figure 17B:
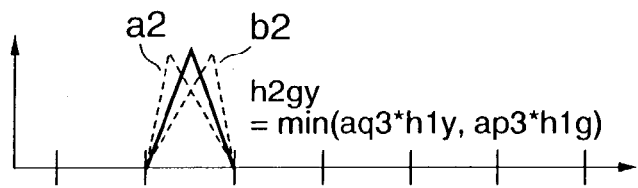
Figure 17C:
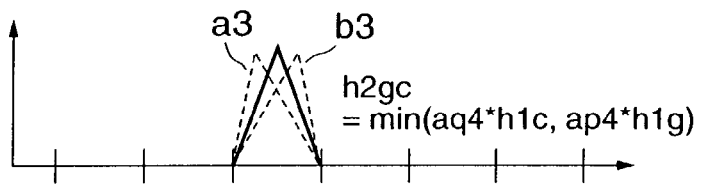
Figure 17D:
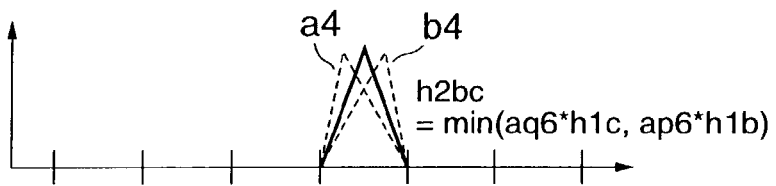
Figure 17E:
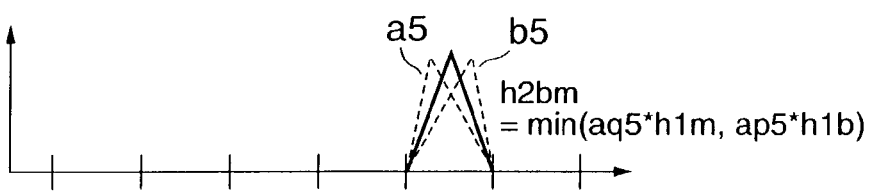
Figure 17F:
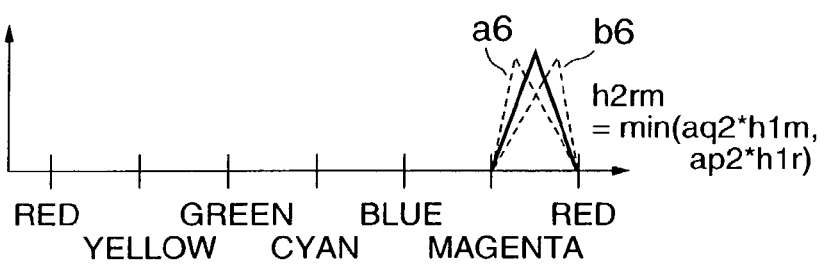
Figure 19:
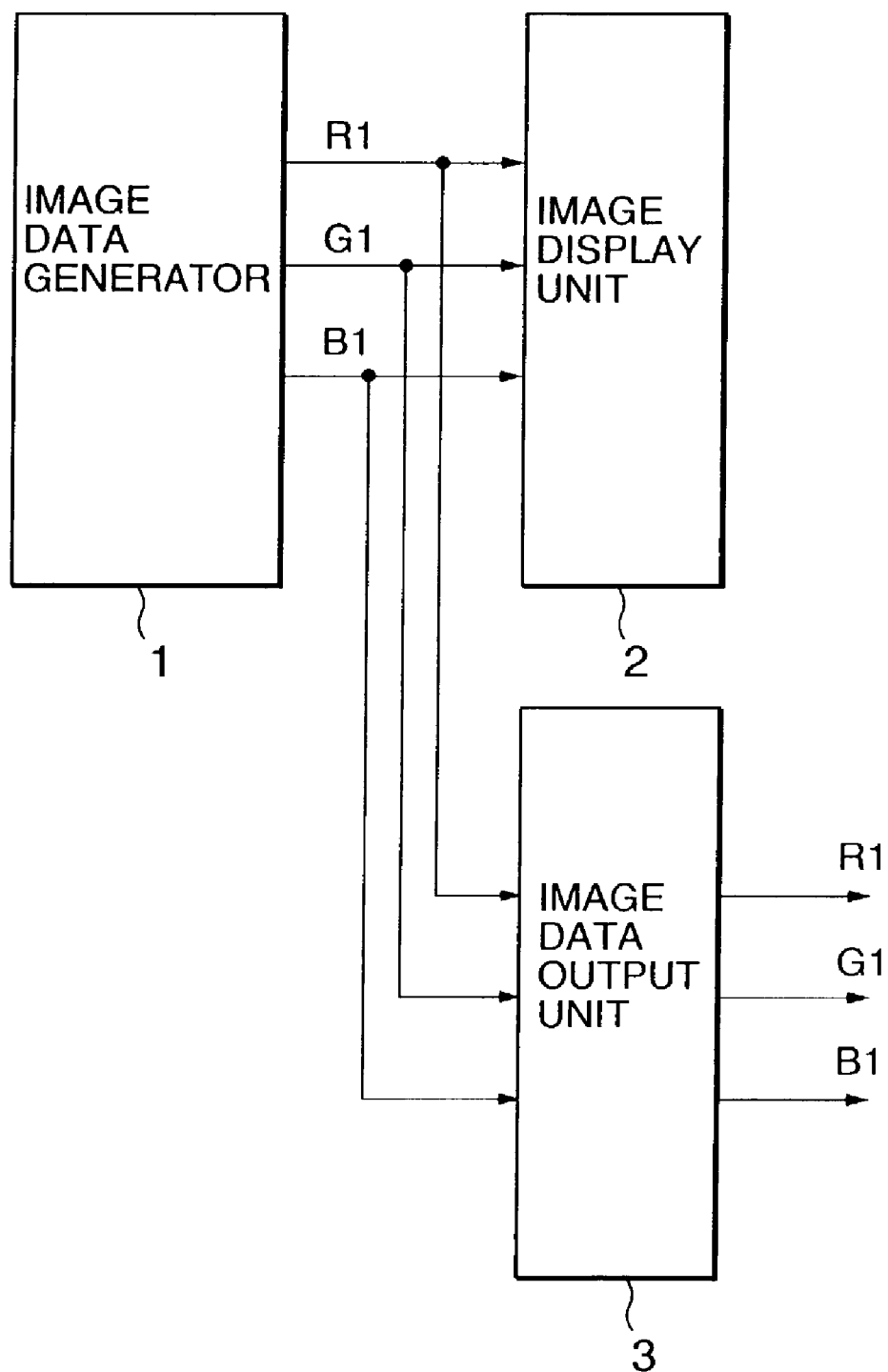
FIG. 19 is a block diagram showing an example of configuration of a conventional image processing device.
Figure 20:
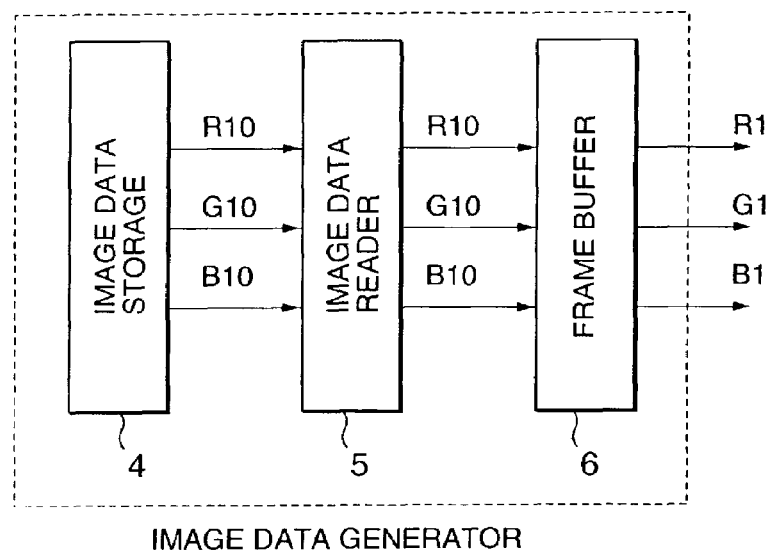
FIG. 20 is a block diagram showing an example of configuration of the image data generator in the conventional image processing device.
Figure 21:
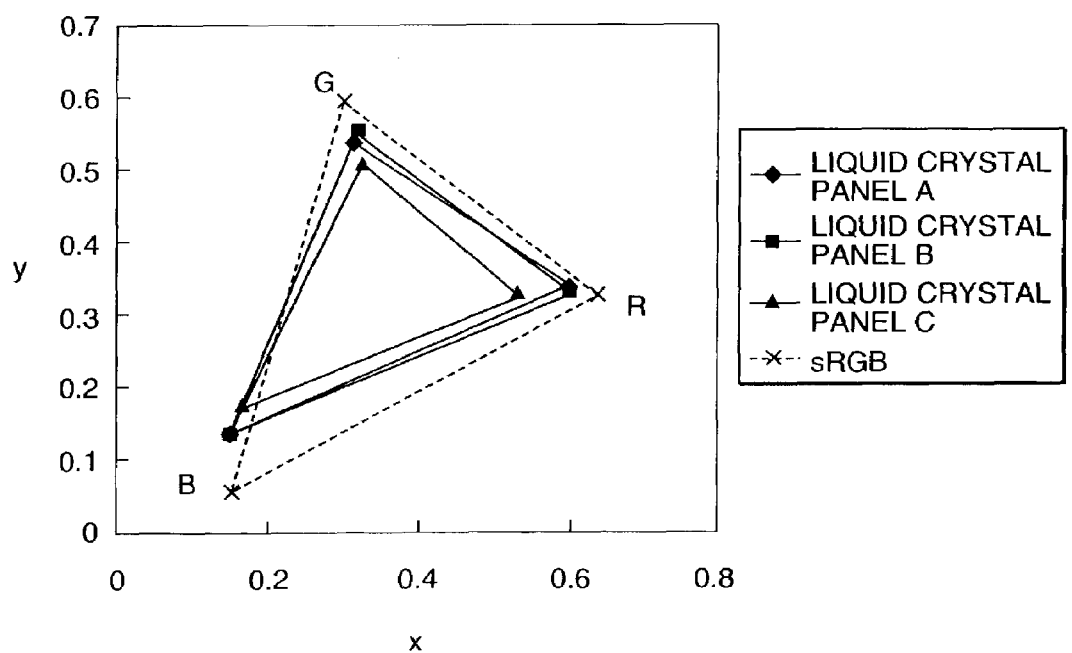
FIG. 21 is an xy chromaticity diagram showing an example of color reproduction of a liquid crystal panel used in notebook type personal computer.
Figure 22:
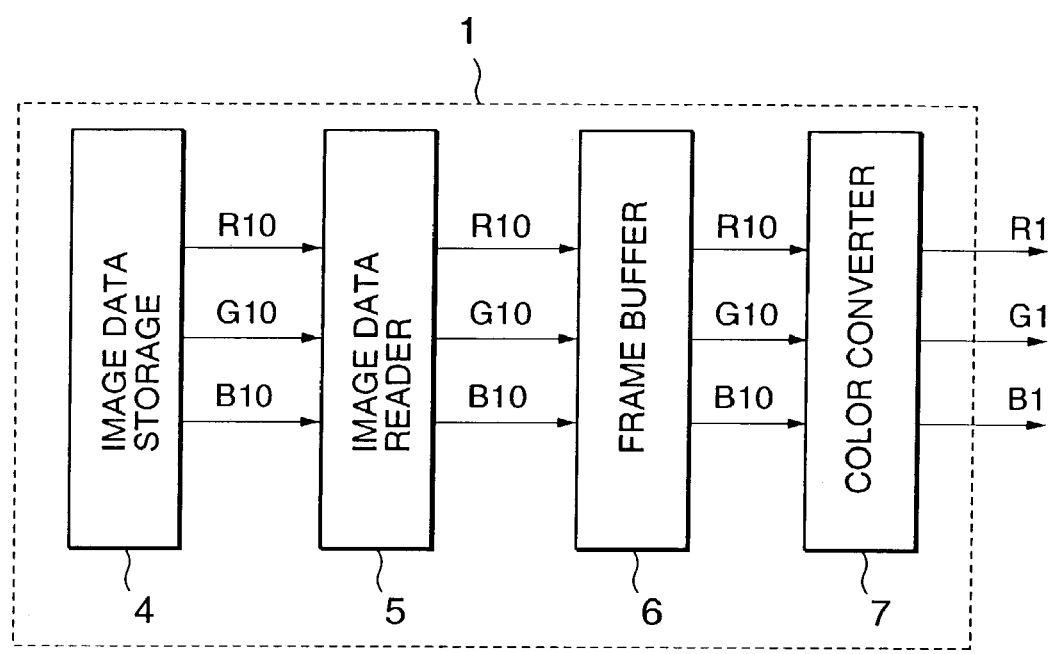
FIG. 22 shows another example of configuration of image data generator 1 in the conventional image processing device.

The αβ calculator 15 generates and outputs the identification code S1 specifying which of the six hue data are zero. The identification code S1 assumes one of six values depending on which of R1, G1, B1 is the maximum value β and the minimum value α. FIG. 11 shows the relationship between the value of the identification code S1, and the maximum value β and the minimum value α of R1, G1, B1, and the hue data which are zero. The values of the identification code S1 shown in FIG. 11 are just an example, and the values of the identification code are not limited to the values shown in FIG. 11.

The six hue data r, g, b, y, m, c output from the hue data calculator 16 are supplied to the polynomial calculator 17. The hue data r, g, b are also supplied to the matrix calculator 18. The polynomial calculator 17 is also supplied with the identification code S1 from the αβ calculator 15, and two data which are non-zero data of r, g, b are selected and used as Q1, Q2 for calculation, and two data which are non-zero data y, m, c are selected and used as P1, P2 for calculation. This operation is described with reference to FIG. 12.

In the polynomial calculator 17, the hue data from the hue data calculator 16, and the identification code S1 from the αβ calculator 15 are input to the zero remover 20. Based on the identification code S1, the zero remover 20 outputs two non-zero data r, g, b as Q1, Q2, and two non-zero data y, m, c as P1, P2. Which of r, g, b, y, m, c are used as Q1, Q2, P1, P2 is determined as shown in FIG. 12, for example, and output. It is seen from FIG. 11 and FIG. 12, that if, for instance, the identification code S1=0, r, b become Q1, Q2, and y, m become P1, P2, so that Q1=r, Q2=b, P1=m, P2=y are output. Like FIG. 11, the values of the identification code S1 in FIG. 12 are just an example, and the values of the identification code are not limited to those shown in FIG. 12.

The minimum value selector 21a selects and outputs the minimum value T4=min(Q1, Q2) of the output data Q1, Q2 from the zero remover 20, and the minimum value selector 21b selects and outputs the minimum value T2=min(P1, P2)

of the output data P1, P2 from the zero remover 20. T4 and T2 output from the minimum value selectors 21a and 21b are used as first arithmetic terms.

The calculation coefficient generator 23 is supplied with the identification code S1 from the αβ calculator 15, and generates signals representing the calculation coefficients aq, ap used for multiplication with the first arithmetic terms T4, T2 at the multipliers 22a, 22b, based on the identification code S1, and supplies the calculation coefficient aq to the multiplier 22a, and the calculation coefficient ap to the multiplier 22b.

The calculation coefficients aq, ap are generated depending on the identification code S1, and six different values of calculation coefficients are generated for the six values of the identification code S1 shown in FIG. 12. The multiplier 22a is supplied with the first arithmetic term T4 from the minimum value selector 21a, and performs the multiplication of the calculation coefficient aq from the calculation coefficient generator 23 with the first arithmetic term T4, aq×T4, and outputs the result to the minimum value selector 21c. The multiplier 22b is supplied with the first arithmetic term T2 from the minimum value selector 21b, and performs the multiplication of the calculation coefficient ap from the calculation coefficient generator 23 with the first arithmetic term T2, ap×T2, and outputs the result to the minimum value selector 21c.

The minimum value selector 21c selects and outputs the minimum value T5=min(ap×T2, aq×T4) of the outputs of the multipliers 22a and 22b. The output T5 from the minimum value selector 21c is used as the second arithmetic term. The above-described polynomial data T2, T4, T5 are outputs of the polynomial calculator 17. The outputs of the polynomial calculator 17 are supplied to the matrix calculator 18.

The coefficient generator 19 in FIG. 9 generates calculation coefficients U(Fij) for the polynomial data, based on the identification code S1, and supplies the generated coefficients to the matrix calculator 18.

The matrix calculator 18 receives the first color data R1, G1, B1, the polynomial data T2, T4, T5 from the polynomial calculator 17, the minimum value α from the αβ calculator 15, and the coefficients U from the coefficient generator 19, and outputs the results of the calculation in accordance with the following equation (6), as the second color data R2, G2, B2.

$$\begin{bmatrix} R2 \\ G2 \\ B2 \end{bmatrix} = \begin{bmatrix} R1 \\ G1 \\ B1 \end{bmatrix} + (Fij) \begin{bmatrix} T2 \\ T4 \\ T5 \\ \alpha \end{bmatrix} \quad (6)$$

In the equation (6), for (Fij), i=1 to 3, j=1 to 4.

FIG. 13 shows an example of configuration of part of the matrix calculator 18 which calculates R2. In FIG. 13, reference numerals 24a to 24d denote multipliers, and 25a to 25d denote adders.

The operation of the circuit of FIG. 13 will next be described. The multipliers 24a to 24d receive the polynomial data T2, T4, T5 from the polynomial calculator 17, the minimum value α from the αβ calculator 15, and the coefficients U(Fij) from the coefficient generator 19, and calculate the respective products.

The adders 25a, 25b receive the products output from the respective multipliers 24a to 24d, and add the input data together, and output the sums. The adder 25c adds the data from the adders 25a, 25b, and outputs the sum. The adder 25d adds the first color data R1 and the data from the adder 25c, and outputs the sum as the second color data R2.

Configurations similar to that shown in FIG. 13 can be used to calculate the second color data G2, B2. If three sets of configurations like those shown in FIG. 13 are used in parallel, the matrix calculation can be achieved at a high speed. Different coefficients (Fij) are used for the respective ones of R2, G2, B2.

The calculation for determining the second color data R2, G2, B2 by the color converter shown in FIG. 9 is therefore as shown in the following equation (7).

$$\begin{bmatrix} R2 \\ G2 \\ B2 \end{bmatrix} = \begin{bmatrix} R1 \\ G1 \\ B1 \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (7)$$

For (Fij), i=1 to 3, j=1 to 13, and
h1r=min(m, y),
h1g=min(y, c),
h1b=min(c, m),
h1c=min(g, b),
h1m=min(b, r),
h1y=min(r, g),
h2ry=min(aq1×h1y, ap1×h1r),
h2rm=min(aq2×h1m, ap2×h1r),
h2gy=min(aq3×h1y, ap3×h1g),
h2gc=min(aq4×h1c, ap4×h1g),
h2bm=min(aq5×h1m, ap5×h1b),
h2bc=min(aq6×h1c, ap6×h1b), and
aq1 to aq6, and ap1 to ap6 are the calculation coefficients generated at the calculation coefficient generator 23 shown in FIG. 10.

The difference in the number of arithmetic terms between the equation (6) and the equation (7), is that the equation (6) shows the calculation, for each pixel, using the arithmetic terms other than those which are zero, while the equation (7) shows a general equation, for a set of pixels.

In other words, the thirteen polynomial data in the equation (6) (the first arithmetic term, the second arithmetic term) can be reduced to the four effective polynomial data for each pixel, and this reduction can be achieved by utilizing the characteristics of the hue data.

The combination of the effective data varies depending on the pixel data of the pixel in question. For the entire set of image data containing all the colors, all the polynomial data are effective.

FIG. 14A to FIG. 14F schematically show the relationship between the six hues and the hue data y, m, c, r, g, b. Each hue data relate to three hues.

The equation (7) contains first arithmetic terms each of which is effective for just one hue. The first arithmetic terms are:
h1r=min(y, m),
h1y=min(r, g), h1g=min(c, y),
h1c=min(g, b),
h1b=min(m, c), and
h1m=min(b, r).

FIG. 15A to FIG. 15F schematically show the relationship between the six hues and the first arithmetic terms h1r, h1y, h1g, h1c, h1b, h1m. Each of the first arithmetic terms relates to a specific hue. For instance, with W being a constant, for red, r=W, g=b=0, so that y=m=W, c=0.

Accordingly, h1r=min(y, m)=W, and the other five first arithmetic terms are all zero. That is, for red, h1r=min(y, m) is the only effective first arithmetic term. Similarly, for green, h1g=min(c, y) is the only effective first arithmetic term; for blue, h1b=min(m, c) is the only effective first arithmetic term; for cyan, h1c=min(g, b) is the only effective first arithmetic term; for magenta, h1m=min(b, r) is the only effective first arithmetic term; and for yellow, h1y=min(r, g) is the only effective first arithmetic term.

FIG. 16A to FIG. 16F schematically show the relationship between the six hues and the second arithmetic terms 2ry=min(h1y, h1r), h2gy=min(h1y, h1g), h2gc=min(h1c, h1g), h2bc=min(h1c, h1b), h2bm=min(h1m, h1b), h2rm=min(h1m, h1r), with the coefficients aq1 to aq6 and ap1 to ap6 for h2ry=min(aq1×h1y, ap1×h1r), h2gy=min(aq3×h1y, ap3×h1g), h2gc=min(aq4×h1c, ap4×h1g), h2bc=min(aq6×h1c, ap6×h1b), h2bm=min(aq5×h1m, ap5×h1b), h2rm=min(aq2×h1m, ap2×h1r) in the equation (7) being equal to 1.

It is seen from FIG. 16A to FIG. 16F, that each of the second arithmetic terms relates to change in an intermediate region in an inter-hue zone between adjacent ones of the six hues red, yellow, green, cyan, blue, and magenta, i.e., in an intermediate region in one of the six inter-hue zones red to yellow, yellow to green, green to cyan, cyan to blue, blue to magenta, and magenta to red. That is, for red to yellow, b=c=0, and five terms other than h2ry=min(h1y, h1r)=min (min(r, g), min(y, m)), are all zero. Accordingly, h2ry is the only effective second arithmetic term. Similarly, for yellow to green, h2gy is the only effective second arithmetic term; for green to cyan, h2gc is the only effective second arithmetic term; for cyan to blue, h2bc is the only effective second arithmetic term; for blue to magenta, h2bm is the only effective second arithmetic term; and for magenta to red, h2rm is the only effective second arithmetic term.

FIG. 17A to FIG. 17F schematically show the relationship between the six hues and the second arithmetic terms, with the calculation coefficients aq1 to aq6 and ap1 to ap6 in the hry, hrm, hgy, hgc, hbm, hbc in the equation (7) being varied. The broken lines a1 to a6 in FIG. 17A to FIG. 17F show the characteristics in the case where aq1 to aq6 are greater than ap1 to ap6. The broken lines b1 to b6 in FIG. 17A to FIG. 17F show the characteristics in the case where ap1 to ap6 are greater than aq1 to aq6.

That is, for red to yellow, h2ry=min(aq1*h1y, ap1*h1r) is the only effective second arithmetic term, as mentioned above. If the ratio between aq1 and ap1 is 2:1, the arithmetic term is such that its peak value is closer to red, in the red-to-yellow inter-hue region, as shown by broken lines a1 in FIG. 17A, and is effective for a region closer to red in the red-to-yellow inter-hue region. If the ratio between aq1 and ap1 is 1:2, the arithmetic term is such that its peak value is closer to yellow, in the red-to-yellow inter-hue zone, as shown by the broken lines b1 in FIG. 17A, and is effective for a region closer to yellow in the red-to-yellow inter-hue zone. Similarly, the region within the inter-hue zone for which the second arithmetic term is effective can be varied:
by varying aq3, ap3 in h2gy for yellow to green;
by varying aq4, ap4 in h2gc for green to cyan;
by varying aq6, ap6 in h2bc for cyan to blue;
by varying aq5, ap5 in h2bm for blue to magenta; and
by varying aq2, ap2 in h24m for magenta to red.

FIG. 18A and FIG. 18B show the relationship between the six hues and inter-hue regions, and the effective arithmetic terms. Accordingly, by varying, by the coefficient generator 19, the coefficients relating to the hue or the inter-hue region which it is desired to adjust, the hue can be adjusted, and the degree of change in the inter-hue zone can be corrected. Moreover, by varying the coefficients, by the calculation coefficient generator 23 in the polynomial calculator 17, the region in the inter-hue zone where the arithmetic term is effective can be varied without affecting other hues.

As has been described, when the color converter according to the present embodiment is used, by varying the coefficients relating to the first arithmetic terms which relate to specific hues, and the second arithmetic terms which relate to specific inter-hue regions, each of the six hues of red, green, blue, yellow, magenta, cyan, and the degree of change in each of the six inter-hue zones can be independently corrected. Accordingly, the conversion characteristics can be varied flexibly.

What is claimed is:

1. An image processing device comprising:
   an image data generator generating a first image data which is image information for each pixel and which includes a plurality of color data, said color data representative of red (R), green (G), and blue (B) values, and when performing an output of said image data said first image is output concurrently to both an image processor and image data output unit;
   said image processor including a color converter, and calculating, based on the R, G, B values of the first image data and the color reproduction characteristics of a display unit, a second image data, which include a plurality of said color data representative of said red (R), green (G), and blue (B) values different from said first image data in said color space, by performing image processing including color conversion on the first image data;
   said image display unit displaying an image using the second image data; and
   said image data output unit for outputting the first image data to the outside.

2. The image processing device as set forth in claim 1, wherein said image data generator generates the first image data as a digital data, and said image data output unit outputs the first image data after conversion into an analog data.

3. The image processing device as set forth in claim 1, wherein said image processor further includes a tone converter for converting the tone of the image data having been color-converted by the color converter.

4. The image processing device as set forth in claim 1, wherein said image processor further includes a dither processor for performing dither processing on the image data having been color-converted by the color converter.

5. The image processing device as set forth in claim 1, wherein said color converter includes a coefficient generator generating predetermined matrix coefficients, an arithmetic term calculator calculating a plurality of arithmetic terms each of which is effective for only a specific hue among a plurality of hues, and a matrix calculator performing matrix calculation on the matrix coefficients and the plurality of the arithmetic terms each of which is effective for only the specific hue.

6. The image processing device as set forth in claim 5, wherein said plurality of hues include six hues of red, green, blue, cyan, magenta, and yellow.

7. The image processing device as set forth in claim 1, wherein said color converter includes a coefficient generator generating predetermined matrix coefficients, an arithmetic term calculator calculating a plurality of arithmetic terms each of which is effective for only a region between adjacent hues, among a plurality of hues, and a matrix calculator performing matrix calculation using the matrix coefficients and the plurality of arithmetic terms each of which is effective for only said region between the hues.

8. The image processing device as set forth in claim 7, wherein said plurality of hues include six hues of red, green, blue, cyan, magenta, and yellow.

9. A method of processing image data, comprising:
obtaining image data by an image data generator;
generating a first image data, which is image information for each pixel, from the image, the first image data including an exact color representation of the image data corresponding to red (R), green (G) and blue (B) values, where at each output of said image data generator said image data is provided concurrently to both an image data output unit and a color converter;
generating a second image data of said color converter by converting the R, G, B values of first image data based on color reproduction characteristics of a display device so that the second image data includes color characteristics of said display device and is representative of said red (R), green (G), and blue (B) values different from said first image data in said color space;
outputting the second image data to the display device; and
outputting the first image data from said image data output unit, this output being a separate output from the output of the second image data.

* * * * *